Figure 1:
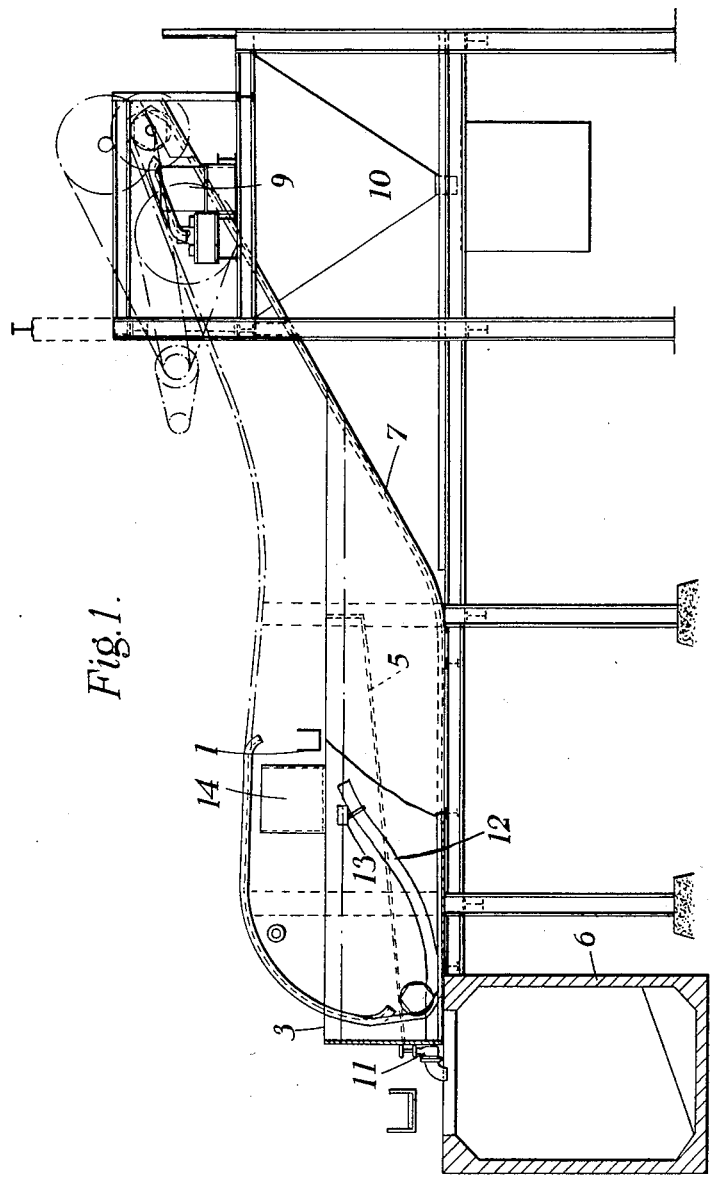

Feb. 20, 1934.  B. NORTON  1,948,184
METHOD OF AND APPARATUS FOR TREATING COAL SLURRY
Filed July 21, 1931.  3 Sheets-Sheet 2

INVENTOR
B. NORTON.
BY
Blair Kilcoyne.
ATTORNEY

Feb. 20, 1934.  B. NORTON  1,948,184
METHOD OF AND APPARATUS FOR TREATING COAL SLURRY
Filed July 21, 1931  3 Sheets-Sheet 3

INVENTOR
B. NORTON,
BY
Blair Kilcoyne
ATTORNEYS

Patented Feb. 20, 1934

1,948,184

UNITED STATES PATENT OFFICE 1,948,184

METHOD OF AND APPARATUS FOR TREATING COAL SLURRY

Bertram Norton, Sandford Hall, Claverley, England

Application July 21, 1931, Serial No. 552,276, and in Great Britain July 23, 1930

13 Claims. (Cl. 209—208)

This invention relates to methods of and apparatus for treating the slurry water from coal washing systems. It has been usual in the past to lead all the returned and overflow water from the washed coal to a pump sump, from which it has been pumped to a main conical settling tank. The water from the top of this tank is continuously drawn off to serve as fresh washing water, while water is also drawn off from the bottom of the tank and constitutes slurry water. This is generally passed over vibrating screens on which fine coal is left, while water still containing a considerable amount of very fine coal and impurities passes through the screens. Generally all this water has been pumped to the conical tank, but in some cases part of it has been led to waste and part returned to the settling tank via the pump sump. The fine particles contained in this water and thus returned to circulation cause the water to deteriorate in condition. Furthermore, when the plant is shut down, as for instance at night, a very considerable amount of sedimentation takes place and in practice it is found that before the plant can be started again sediment has to be removed from the bottom of the conical tank. Often there is so much sediment present that the valves become blocked up.

The main object of the present invention is to provide an improved method of purifying the slurry water such that the amount of sedimentation which takes place in the main settling tank is very considerably reduced. Another object of the invention is to provide an apparatus by means of which improved removal of fine particles from slurry water or from water from which slurry has been extracted may be carried on efficiently and continuously. Other objects of the invention will hereinafter appear.

In proceeding in accordance with the present invention, at least one secondary settling tank is provided in addition to the main settling tank and receives the slurry water or the water from which the slurry has been extracted. This water is allowed to remain in the settling tank for sufficient time for settling of the very fine particles to take place, and is then led to a sump from which a pump forces it to the main settling tank. The fine particles deposited in the secondary settling tank are removed preferably by means of a scraper conveyor.

It is preferred to withdraw the water from the secondary settling tank at or approximately at the level of its surface, so that the settled particles are undisturbed during the process of withdrawal and subsequently to start up the scraper conveyor and thus to remove the settled fine particles.

When a single settling tank is used, the water flows into it and rises until it is full and then overflows, passing to the pump sump. A slowly-moving scraper conveyor passes along the bottom of the tank, taking with it such fine particles as settle while the water is running. When the plant is shut down at the end of the day or shift, the scraper conveyor is stopped, thus allowing the still water settling to take place. At the end of this period the water is led off through a valve-controlled flexible or hinged pipe connected to a float in such a way that its mouth lies just below the surface of the water and rises and falls with the level of the water in the tank. When the level of the settled fine particles is reached the conveyor is started again.

Preferably, however, two or more settling tanks are employed in parallel, the one being supplied with water during the time that the settling, removal of water and removal of fine particles are taking place in the other or others.

The settling tank may be made of elongated shape and the height of its sides and ends be such that overflow takes place from one or both sides during the delivery period when the tank is full. By this means the velocity of the water is reduced relatively to that in previous settling tanks in which the water has flowed over at one end. Furthermore, the general body of the water is less disturbed and consequently more settling takes place.

The settling may be accelerated by the addition of a solution of alum in water or of other suitable chemical agent. This addition can be made either directly into the tank or with the incoming water and is particularly effective when a scraper conveyor is used, since the fines are then deposited to a greater extent while the water is running and can be removed straight away by the conveyor.

Figure 3:
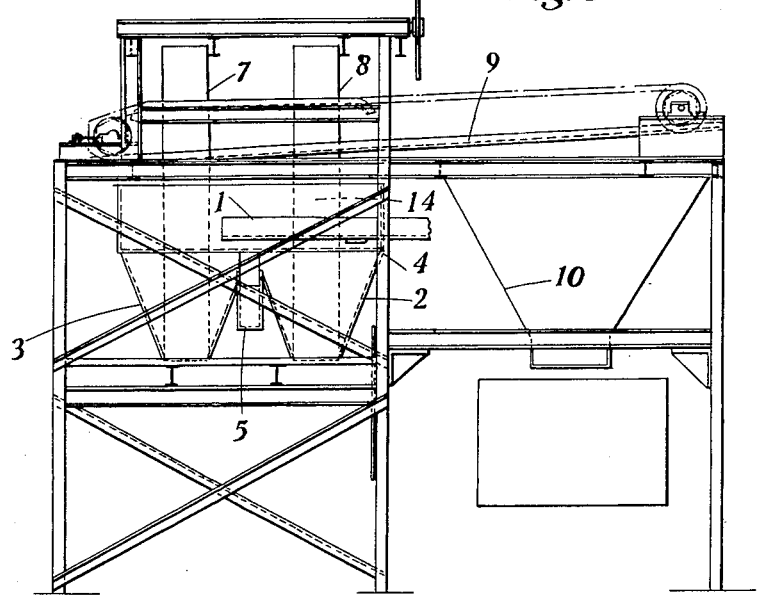

In order that the invention may be clearly understood and readily carried into effect, one process and apparatus in accordance therewith will now be described by way of example with reference to the accompanying drawing in which Figure 1 shows an elevation, certain parts being broken away,

Figure 2 a plan,

Figure 3 an end view of the apparatus, and

Figure 4:
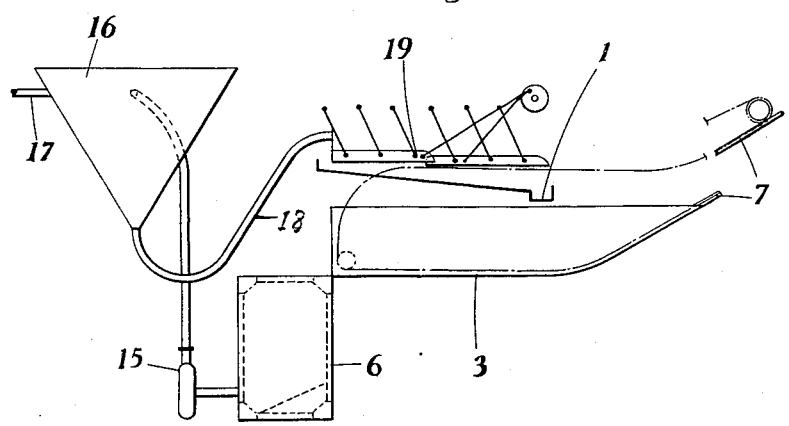

Figure 4 is a diagram showing the relative positions of various units of the whole system.

Figure 2:
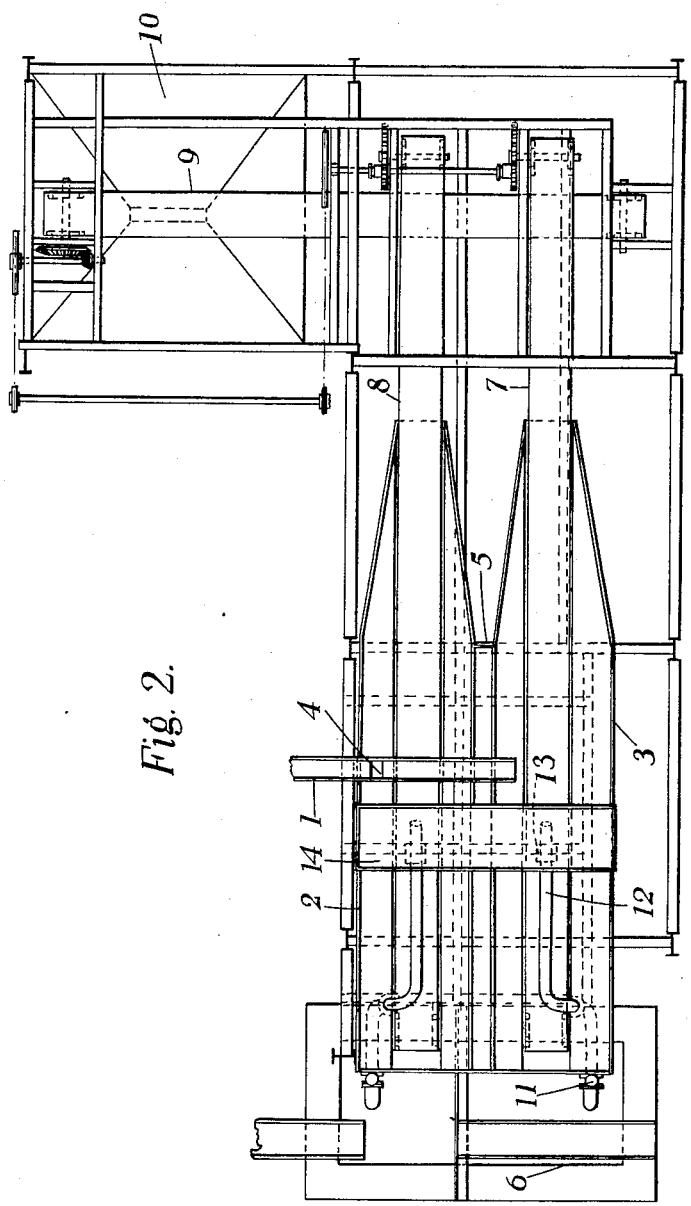

Referring first to Figures 1 to 3, the water from which the slurry has been extracted is delivered down a trough 1 to one or other of two secondary settling tanks 2 and 3 according as a valve controlling an opening 4 is open or closed, in the example shown to the tank 3. The water rises in the tank 3 until it flows over the inner side edge thereof into a trough 5 lying between the tanks 2 and 3, and discharging into a pump sump 6 which is the main sump of the whole washing system. At this stage the valve controlling the opening 4 is changed over so that the incoming water is delivered into the tank 2 and the water in the tank 3 is allowed to settle. Simultaneously a slowly moving scraper conveyor 7, which has been removing any deposited fine particles from the tank 3, is stopped. A similar conveyor 8 runs through the tank 2 and the fine particles discharged from both conveyors are carried by another scraper conveyor 9 to a bunker 10.

After settling has taken place in the tank 3, a valve 11 is opened. This valve controls a rubber pipe 12, the end of which is supported by a float 13 so that the open end of the pipe lies just below the surface of the water in the tank 3. This pipe 12 thus falls as the water is discharged through it into the pump sump 6. When the level of the settled fine particles is reached, the valve 11 is closed and the conveyor 7 is started. After this has removed the fine particles, the tank 2 will be full and the incoming water is again changed over from one tank to the other.

A solution of alum and water is supplied to the tanks 2 and 3 from a tank 14.

Figure 4 shows diagrammatically the arrangement of the whole slurry water system. In this figure the pump sump is again shown at 6, and it will be understood that not only the water from the secondary settling tanks 2 and 3 is delivered into this pump sump 6 but also any returned and overflow water from the washed coal. All this water is pumped by a pump 15 up to the main conical settling tank 16 of the system. From the top of this tank 16 water is continuously drawn off through a pipe 17 to serve as fresh washing water, while from the bottom of the tank 16 slurry water is drawn off through a pipe 18 and is supplied to a vibrating sieve 19. Fine coal is recovered from the end of the sieve, while water still containing the impurities of the slurry water drains through to a collecting trough, which is the trough 1 by which it is delivered to the secondary settling tanks 2 and 3.

I claim:

1. In the treatment of water in coal washing systems, the steps which comprise passing the returned and overflow water from the washed coal to a main settling tank, taking slurry water from the said settling tank, treating the slurry water for the recovery of fine coal slurry contained there, passing the water from which the fine coal slurry has been removed to at least one secondary settling tank, allowing the water to remain stationary therein for sufficient time for settling of fine particles to take place, removing the fine particles deposited in said secondary settling tank and returning the water from said secondary settling tank to said main settling tank.

2. In the treatment of water in coal washing systems, the steps which comprise passing the returned and overflow water from the washed coal to a main settling tank, taking slurry water from the said settling tank, treating the slurry water for the recovery of fine coal slurry contained therein, passing the water from which the fine coal slurry has been removed to at least one secondary settling tank while simultaneously removing fine particles from said secondary settling tank, subsequently allowing the water to remain stationary therein for sufficient period for settling of fine particles to take place while discontinuing such removal of the fine particles during said period, emptying said secondary settling tank, removing from said secondary settling tank the deposited particles and returning to said main settling tank the water emptied from said secondary settling tank.

3. In the treatment of water in coal washing systems, the steps which comprise passing the returned and overflow water from the washed coal to a main settling tank, taking slurry water from the said settling tank, treating the slurry water for the recovery of fine coal slurry contained therein, passing the water from which the fine coal slurry has been removed to at least one secondary settling tank, allowing the water to remain stationary therein for sufficient time for settling of fine particles to take place, emptying said secondary settling tank by withdrawing the water at its approximate surface level, subsequently removing the fine particles deposited in said secondary settling tank, and pumping to said main settling tank the water emptied from said secondary settling tank.

4. In the treatment of water in coal washing systems, the steps which comprise passing the returned and overflow water from the washed coal to a main settling tank, taking slurry water from said settling tank, treating the slurry water for the recovery of fine coal slurry contained therein, passing the water from which the fine coal slurry has been removed to a secondary settling tank, allowing the water to remain stationary therein for sufficient time for settling of fine particles to take place, then discharging said water and removing fine particles deposited in said secondary settling tank, and while said steps of settling, water discharge and removal of fine particles are proceeding in said secondary settling tank, directing the water to a second secondary settling tank, subsequently re-directing the water to said first secondary settling tank and conducting in said second secondary settling tank the steps of settling, water discharge and removal of fine particles, and pumping to said main settling tank the water discharged from both said secondary settling tanks.

5. In the treatment of slurry water derived from coal washing systems, the steps which comprise passing the slurry water into a secondary settling tank separate from the main settling tank of the system, allowing the water to remain therein for sufficient time for settling of the very fine particles to take place, then emptying said secondary settling tank by withdrawing the water at its approximate surface level, and subsequently removing the settled fine particles from said secondary settling tank while directing the slurry water during said steps of settling, emptying and particle removal into a second secondary settling tank, re-directing the slurry water into said first secondary settling tank after the completion of the particle removal then carrying out in said second secondary settling tank said steps of settling, emptying and particle removal, and re-directing concurrently with the carrying out of the aforesaid steps in the secondary settling tanks the water withdrawn from said secondary tanks into said main settling tank.

6. In the treatment of slurry water derived from coal washing systems, the steps which comprise treating the slurry water for the recovery of fine coal slurry contained therein, passing the slurry water into a secondary settling tank separate from the main settling tank of the system, allowing the water to remain therein for sufficient time for settling of the very fine particles to take place, then emptying said secondary settling tank by withdrawing the water at its approximate surface level, and subsequently removing the settled fine particles from said secondary settling tank.

7. In the treatment of water in coal washing systems, the steps which comprise passing the returned and overflow water from the washed coal to a main settling tank, taking slurry water from the said settling tank, treating the slurry water for the recovery of fine coal slurry contained therein, passing the water from which the fine coal slurry has been removed to at least one secondary settling tank, adding a settling-accelerating agent to said secondary settling tank, allowing the water to remain stationary therein for sufficient time for settling of fine particles to take place, removing the fine particles deposited in said secondary settling tank and pumping the water from said secondary settling tank to said main settling tank.

8. In a coal washing system, the combination of a main settling tank, means for withdrawing slurry water from said main settling tank, means for recovering fine coal slurry from the slurry water thus withdrawn, at least one secondary settling tank placed to receive the water from which the slurry has been extracted, a scraper conveyor passing through said secondary settling tank and adapted to remove from the system impurities deposited in said secondary settling tanks, a sump placed to receive the water from said secondary settling tank or tanks and a pump arranged to pump water from the said sump to said main settling tank.

9. In a coal washing system, the combination of a main settling tank, means for withdrawing slurry water from said main settling tank, means for recovering fine coal slurry from the slurry water thus withdrawn, at least one secondary settling tank placed to receive the water from which the slurry has been extracted, said secondary settling tank being made of elongated shape and having the height of its sides and ends such that overflow therefrom takes place only along one or both sides, a scraper conveyor passing through said secondary settling tank and adapted to remove from the system impurities deposited therein, a sump placed to receive the water overflowing and emptied from said secondary settling tank or tanks and a pump arranged to pump water from the said sump to said main settling tank.

10. In a coal washing system, the combination of a main settling tank, means for withdrawing slurry water from said main settling tank, means for recovering fine coal slurry from the slurry water thus withdrawn, two secondary settling tanks placed to receive the water from which the slurry has been extracted, means for directing said water alternately to each of said secondary settling tanks, each of said secondary settling tanks containing at least one scraper conveyor adapted to remove from the system impurities deposited in said secondary settling tank, a sump placed to receive the water from said secondary settling tanks and a pump arranged to pump water from the said sump to said main settling tank.

11. In a coal washing system, the combination of a main settling tank, two secondary settling tanks, means for withdrawing slurry water from said main settling tank, means for supplying said water thus withdrawn alternately to each of said secondary settling tanks, means in each of said secondary settling tanks for removing fine particles deposited therein and means in each of said secondary settling tanks for emptying them from their surface downwards, both of said emptying means being adapted to remove constantly the upper layer of water through a discharge opening formed in said emptying means and operatively connected to sink as the water level falls.

12. In a coal washing system, the combination of a main settling tank, means for withdrawing slurry water from said main settling tank, means for recovering fine coal slurry from the slurry water thus withdrawn, at least one secondary settling tank placed to receive the water from which the slurry has been extracted, means for adding a settling-accelerating agent to said secondary settling tank, a scraper conveyor passing through said secondary settling tank and adapted to remove from the system impurities deposited in said secondary settling tanks, a sump placed to receive the water from said secondary settling tank or tanks and a pump arranged to pump water from the said sump to said main settling tank.

13. In a coal washing system, the combination of a main settling tank, means for withdrawing slurry water from said main settling tank, means for recovering fine coal slurry from the slurry water thus withdrawn, two secondary settling tanks placed to receive the water from which the slurry has been extracted, means for directing said water alternately into each of said secondary settling tanks, conveyor mechanism in each of said secondary settling tanks adapted to remove from the system impurities deposited in said secondary settling tank, means for emptying said secondary settling tanks, said means being adapted to remove constantly the upper layer of the water through a discharge opening operatively connected to sink as the water level falls, a sump placed to receive water from said secondary settling tanks and a pump arranged to pump water from the said sump to said main settling tank.

BERTRAM NORTON.

CERTIFICATE OF CORRECTION.

Patent No. 1,948,184.   February 20, 1934.

BERTRAM NORTON.

It is hereby certified that error appears in the printed specification of the above numbered patent requiring correction as follows: Page 3, line 101, claim 11, after "falls" and before the period insert the comma and words, and means for redirecting the water withdrawn from the secondary settling tank into said main settling tank; and that the said Letters Patent should be read with this correction therein that the same may conform to the record of the case in the Patent Office.

Signed and sealed this 16th day of February, A. D. 1937.

(Seal)

Henry Van Arsdale
Acting Commissioner of Patents.